United States Patent [19]
Yashiro

[11] Patent Number: 6,045,971
[45] Date of Patent: *Apr. 4, 2000

[54] OPTICAL INFORMATION RECORDING MEDIUM AND METHOD OF PRODUCING THE SAME

[75] Inventor: Toru Yashiro, Kanagawa, Japan

[73] Assignee: Ricoh Company, Ltd., Tokyo, Japan

[*] Notice: This patent is subject to a terminal disclaimer.

[21] Appl. No.: 09/019,103

[22] Filed: Feb. 5, 1998

[30] Foreign Application Priority Data

Jul. 31, 1997 [JP] Japan ..................................... 9-220091

[51] Int. Cl.[7] ...................................................... G11B 7/24
[52] U.S. Cl. .................. 430/270.16; 430/945; 428/64.2; 428/64.4; 428/913; 428/912; 369/283; 369/288
[58] Field of Search ............................... 430/270.16, 945; 428/64.2, 64.4, 913, 912; 369/283, 288

[56] References Cited

U.S. PATENT DOCUMENTS

| | | | |
|---|---|---|---|
| 4,458,004 | 7/1984 | Tanikawa | 430/270.16 |
| 5,124,067 | 6/1992 | Itoh et al. | 540/140 |
| 5,238,722 | 8/1993 | Yashiro et al. | 430/945 |
| 5,242,730 | 9/1993 | Yashiro et al. | 428/913 |
| 5,252,372 | 10/1993 | Yashiro et al. | 428/913 |
| 5,348,840 | 9/1994 | Sakamoto et al. | 430/270.16 |
| 5,516,900 | 5/1996 | Kimura et al. | 540/135 |
| 5,532,033 | 7/1996 | Yashiro | 430/270.16 |
| 5,580,696 | 12/1996 | Yashiro | 430/270.17 |
| 5,663,326 | 9/1997 | Wolleb | 540/139 |
| 5,677,025 | 10/1997 | Tomura et al. | 430/270.16 |
| 5,882,757 | 3/1999 | Yashiro | 430/270.17 |
| 5,968,708 | 10/1999 | Yashiro et al. | 430/945 |

FOREIGN PATENT DOCUMENTS

| | | |
|---|---|---|
| 0 285 965 | 10/1988 | European Pat. Off. . |
| 0 703 280 | 3/1996 | European Pat. Off. . |
| 1-195093 | 8/1989 | Japan . |

OTHER PUBLICATIONS

Database WPI, Derwent Publications, AN 89–063745, JP 1–014087, Jan. 18, 1989.

Database WPI, Derwent Publications, AN 96–093321, JP 8–002108, Jan. 09, 1996.

*Primary Examiner*—Martin Angebranndt
*Attorney, Agent, or Firm*—Oblon, Spivak, McClelland, Maier & Neustadt, P.C.

[57] ABSTRACT

An optical information recording medium includes a substrate, and a light absorption layer formed thereon which includes a phthalocyanine compound (I), a phthalocyanine compound (II) and a phthalocyanine compound (III) as specified in the specification. This optical information recording medium can be produced by providing the light absorption layer, directly or via an intermediate layer, on a substrate with information pits and/or guide grooves being formed on the surface thereof by film formation coating, providing a light reflection layer, directly or via an intermediate layer, on the light absorption layer by vacuum film formation, and then providing a protective layer on the light reflection layer.

6 Claims, 6 Drawing Sheets

OPTICAL INFORMATION RECORDING MEDIUM AND METHOD OF PRODUCING THE SAME

BACKGROUND OF THE INVENTION

1. Field of the Invention

The present invention relates to an optical information recording medium with improved optical characteristics and also to a method of producing the optical information recording medium.

2. Discussion of Background

Recently write once read many type CDs (compact disks) have been actively developed. These CDs, unlike conventional CDs, have a feature that user's information can be recorded and recorded information can be reproduced by commercially available CD players, since such write once read many type CDs meet the standards of the conventional CDs.

A recording and reproduction medium of the above-mentioned write once read many type is proposed in Japanese Laid-open Patent Application 2-42652, which can be fabricated by spin coating a dye on a substrate to provide a light absorption layer on the substrate, and providing a metal reflection layer on the back side of the substrate opposite to the light absorption layer.

Furthermore, Japanese Laid-Open Patent Application 2-132656 discloses that appropriate selection of the complex index of refraction and the thickness of the light absorption layer provides a compact disk which satisfies the CD standards with respect to recorded signals. Such compact disks are now in fact commercialized as write once read many type CDS.

However, write once read many type CDS using dyes as disclosed in Japanese Laid-Open Patent Applications 2-42652 and 2-132656 do not have sufficient light resistance for use in practice and therefore have the shortcoming that the signal characteristics thereof are caused to deteriorate when exposed to sunrays for an extended period of time, and eventually these CDs become unable to satisfy the CD standards.

The above-mentioned problem is considered to be caused by the deterioration of dyes used therein, in particular, conventionally employed cyanine dyes, when the dyes are exposed to light.

In order to minimize the deterioration of such dyes, there has been proposed the addition of a light stabilizer to the light absorption layer as disclosed in Japanese Laid-Open Patent Application 63-159090. However, in the light absorption layer disclosed in Japanese Laid-Open Patent Application 63-159090, when the light stabilizer is added in a small amount, specifically in an amount of less than 20 wt. % of the entire weight of the light absorption layer, sufficient light resistance for use in practice cannot be attained, while when the light stabilizer is added in a large amount, specifically in an amount of more than 20 wt. %, the optical and/or thermal characteristics of the light absorption layer change and various signal characteristics therefore deteriorate.

Japanese Laid-Open Patent Application 3-62878 discloses a write once and read many type CD, which employs a highly light resistant phthalocyanine compound. More specifically, in the case of this CD, a particular group is introduced into a phthalocyanine compound which is used in the light absorption layer thereof, and such phthalocaynine compound is spin coated, whereby the complex index of refraction of the light absorption layer is appropriately adjusted so as to be suitable for use in the write once read many type CD. Thus, a highly light resistant write once read many type CD is obtained. The write once read many type CD disclosed in the above-mentioned Japanese Laid-Open Patent Application 3-62878, however, has the shortcoming that the quality of regenerative signals is inferior to the quality of regenerative signals output from light absorption layers comprising the conventional cyanine dyes. More specifically, the CD disclosed in the above-mentioned Japanese Laid-Open Patent Application 3-62878 has the shortcoming that the signal length (pit length) of each of signals which constitute regenerative signals is apt to deviate from a theoretical intrinsic value of CD signals, and therefore reproduction errors are apt to occur.

SUMMARY OF THE INVENTION

It is therefore a first object of the present invention to provide a highly light resistant optical information recording medium comprising a light absorption layer in which there is employed three phthalocyanine compounds free of the above-mentioned conventional problems concerning regenerative signals.

A second object of the present invention is to provide a method of producing the above-mentioned highly light resistant optical information recording medium.

The first object of the present invention can be achieved by an optical information recording medium which comprises a substrate, and a light absorption layer formed on the substrate, comprising a phthalocyanine compound (I), a phthalocyanine compound (II), and a phthalocyanine compound (III):

(I)

wherein $M^1$ is VO, one of $A^{11}$ or $A^{12}$, one of $A^{13}$ or $A^{14}$, one of $A^{15}$ or $A^{16}$, and one of $A^{17}$ or $A^{18}$ are each independently —O—$C(R^1)(R^2)(R^3)$, and the other in each pair is a hydrogen atom, in which $R^1$ is a fluorine-substituted alkyl group, $R^3$ is a fluorine-substituted or unsubstituted alkyl group, or a hydrogen atom, and $R^2$ is an unsubstituted phenyl group or a phenyl group substituted with an alkyl group, (II)

wherein M² is Zn, one of A²¹ or A²², one of A²³ or A²⁴, one of A²⁵ or A²⁶, and one of A²⁷ or A²⁸ are each independently —O—C(R¹)(R²)(R³), and the other in each pair is a hydrogen atom, in which R¹ is a fluorine-substituted alkyl group, R³ is a fluorine-substituted or unsubstituted alkyl group, or a hydrogen atom, and R² is an unsubstituted phenyl group or a phenyl group substituted with an alkyl group, (III)

wherein M² is Zn, one of A³¹ or A³², one of A³³ or A³⁴, one of A³⁵ or A³⁶, and one of A³⁷ or A³⁸ are each independently —O—R⁴ or —S—R⁴, and the other in each pair is a hydrogen atom, in which A⁴ is an unsubstituted phenyl group or a phenyl group substituted with an alkyl group.

In the above optical information recording medium, it is preferable that when the molar ratio of the phthalocyanine compound (I) to the phthalocyanine compound (II) to the phthalocyanine compound (III) contained in the light absorption layer is x to y to z, x be in a range of 0.3 to 0.7, y be in a range of 0.1 to 0.4, and z be in a range of 0.2 to 0.6, provided that x+y+z=1.

The second object of the present invention is achieved by a method of producing an optical information recording medium comprising the steps of successively overlaying (a) the above-mentioned light absorption layer, directly or via an intermediate layer, on a substrate with information pits and/or guide grooves being formed on the surface thereof, by film formation coating, (b) a light reflection layer, directly or via an intermediate layer, on the light absorption layer by vacuum film formation, and (c) a protective layer on the light reflection layer. dr

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The optical information recording medium of the present invention comprises a substrate, and a light absorption layer formed on the substrate, comprising the above-mentioned phthalocyanine compound (I), phthalocyanine compound (II), and phthalocyanine compound (III).

The phthalocyanine compound (I) has a thermal decomposition temperature of 200° C. to 350° C., which is a relatively lower thermal decomposition temperature than those of conventional phthalocyanine compounds, and therefore is apt to form recording pits by thermal decomposition, so that the phthalocyanine compound (I) exhibits excellent recording sensitivity with a minimum noise jitter, when used in optical information recording media, but has the above mentioned shortcoming that the pit length is apt to deviate from a necessary pit length (a theoretical value of the length) because the recording pits tend to expand by the application of heat.

Furthermore, the light absorption band of a film of this phthalocyanine compound (I) is in a long wavelength range and the light absorption of the film at an LD wavelength (780 nm) employed for recording and reproduction is excessive, so that high reflectivity is difficult to obtain.

The phthalocyanine compound (II) has the same substituents as those of the phthalocyanine compound (I) and also has the same thermal decomposition characteristics as those of the phthalocyanine compound (I). However, in contrast to the phthalocyanine compound (I), the light absorption band of a film of the phthalocyanine compound (II) is in a short wavelength range and the light absorption of the film at the above-mentioned LD wavelength employed for recording and reproduction is so small that high reflectivity can be obtained, but excellent recording sensitivity is difficult to obtain.

The phthalocyanine compound (III) has a thermal decomposition temperature of 350° C. to 450° C., which is higher than the thermal decomposition temperatures of the phthalocyanine compounds (I) and (II), and therefore is not as good as the phthalocyanine compound (I) with respect to the recording sensitivity and the noise jitter, when used in optical information recording media, but has the feature that its pit length deviation is small.

In the present invention, the term "thermal decomposition temperature", means a thermal weight change temperature, that is, the TG inflection point of a curve indicating the changes in the weight of a sample compound in the form of powder or the temperature at which the weight of the sample compound changes by 5%, under the application of heat thereto with a temperature elevation rate of 10° C./min, which is measured by a thermobalance, that is, by thermogravimetry.

In the present invention, as the main components for the light absorption layer, the phthalocyanine compound (I), the phthalocyanine compound (II) and the phthalocyanine compound (III) are used in combination, whereby the thermal characteristics, and optical characteristics thereof such as recording sensitivity, noise jitter and pit length deviation can be each well balanced.

In order to properly balance the above-mentioned characteristics more effectively, it is preferable that when the molar ratio of the phthalocyanine compound (I) to the phthalocyanine compound (II) to the phthalocyanine compound (III) contained in the light absorption layer is x to y to z, x be in a range of 0.3 to 0.7, y be in a range of 0.1 to 0.4, and z be in a range of 0.2 to 0.6, provided that x+y+z=1.

The phthalocyanine compound (I) has such thermal decomposition characteristics that the thermal decomposition temperature thereof is in the range of 200° C. to 350° C. because of the presence of such a substituent as the benzyloxy group (phenylmethyloxy group) represented by —O—C($R^1$)($R^2$)($R^3$)

In the above benzyloxy group, $R^1$ is a fluorine-substituted alkyl group, and the thermal decomposition temperature and the light absorption band wavelength of the phthalocyanine compound (I) can be adjusted by the choice of $R^1$. In other words, by increasing the number of carbon atoms in $R^1$, the thermal decomposition temperature can be lowered, while by increasing the number of fluorine atoms, the light absorption band wavelength can be shifted to a shorter wavelength.

In the case where the above-mentioned shifting of the light absorption band wavelength to a shorter wavelength cannot be performed by the fluorine-atom substitution, the light absorption band is in a long wavelength range, so that the light absorption of the film is large at the LD wavelength (780 nm) that the film is not suitable for use in medium with high reflectivity such as CD-R.

The center metal represented by $M^1$ in the phthalocyanine compound (I) is VO, and because of the presence of this center metal, excellent durability with respect to light resistance and heat resistance and the effect of the shifting of the light absorption band wavelength to a long wavelength can be obtained.

Specific examples of the fluorine-substituted alkyl group represented by $R^1$ are —$CF_3$, —$C_2F_5$—$CF(CF_3)_2$, and —$C_4F_9$. The smaller the number of carbon atoms, the better, such as —$CF_3$ and —$C_2F_5$ as the fluorine-substituted alkyl group represented by $R^1$ in the present invention.

Specific examples of an unsubstituted phenyl group or a phenyl group substituted with an alkyl group represented by $R^2$ are as follows:

As mentioned above, $R^3$ represents the same fluorine-substituted alkyl group as $R^1$, an unsubstituted alkyl group, or a hydrogen atom. Specific examples of fluorine-substituted alkyl group represented by $R^3$ are the same as those of the specific examples of the fluorine-substituted alkyl group represented by $R^1$. Specific examples of the alkyl group represented by $R^3$ are methyl group, ethyl group, n-propyl group, isopropyl group, n-butyl group, sec-butyl group and tert-butyl group.

The phthalocyanine compound (II) is the same as the phthalocyanine compound (I) except that the center metal of the phthalocyanine compound (II) is Zn, while the center metal of the phthalocyanine compound (I) is VO.

The substituents of the phthalocyanine compound (II) have the same function as those of the substituents of the phthalocyanine compound (I).

The center metal Zn of the phthalocyanine compound (II) has the function of shifting the light absorption band wavelength to a short wavelength by about 30 nm in comparison with the center metal VO of the phthalocyanine compound (I).

The phthalocyanine compound (III) has a thermal decomposition temperature in the range of 350° C. to 450° C. by the effect of the substituent —O—$R^4$ or —S—$R^4$.

Specific examples of an unsubstituted phenyl group or a phenyl group substituted with an alkyl group represented by $R^4$ are as follows:

It is preferable that the substituent alkyl group of the phenyl group substituted with an alkyl group represented by $R^4$ have 1 to 4 carbon atoms in order to obtain an appropriate absorbance of the light absorption layer per unit thickness of the layer and an appropriate complex index of refraction of the layer.

The substituent —S—$R^4$ is more preferable than the substituent —O—$R^4$ for the phthalocyanine compound (III) since the substituent —S—$R^4$ is capable of shifting the light absorption band wavelength to a long wavelength by about 15 nm in comparison with the substituent —O—$R^4$, whereby a better recording sensitivity can be obtained.

The light absorption layer comprising the above-mentioned phthalocyanine compounds (I), (II) and (III) can be provided without difficulty by the steps of dissolving the three compounds in a solvent to prepare a coating liquid and coating the coating liquid on a substrate.

It is preferable that amino compounds be added to the light absorption layer in addition to the above-mentioned phthalocyanine compounds (I), (II) and (III). This is because amino compounds are apt to be coordinated with the center metals $M^1$ and $M^2$ of the phthalocyanine compounds (I), (II) and (III). When amino compounds are coordinated with the center metals $M^1$ and $M^2$ of the phthalocyanine compounds (I), (II) and (III), the solubilities of the phthalocyanine compounds (I), (II) and (III) in solvents are increased by the above coordination and therefore the film formation properties of the compounds (I), (II) and (III) are significantly improved.

Specific examples of such amino compounds are as follows, but amino compounds for use in the present invention are not limited to the following:

n-butylamine, n-hexylamine, tert-butylamine, pyrrole, pyrrolidine, pyridine, piperidine, purine, imidazole, benzimidazole, 5,6-dimethylbenzimidazole, 2,5,6-trimethylbenzimidazole, naphthoimidazole, 2-methylnaphthoimidazole, quinoline, isoquinoline, quinoxaline, benzoquinoline, phenanthridine, indoline, carbazole, norharman, thiazole, benzothiazole, benzoxazole, benzotriazole, 7-azaindole, tetrahydroquinoline, triphenylimidazole, phthalimide, benzoisoquinolin-5,10-dione, triazine, perimidine, 5-chlorotriazole, ethylenediamine, azobenzene, trimethylamine, N,N-dimethylformamide, 1(2H)phthalazinone, phthalhydrazide, 1,3-diiminoisoindoline, oxazole, polyimidazole, polybenzimidazole, and polythiazole.

Of the above amino compounds, compounds having heterocyclic rings including N atoms are preferable, since such compounds are capable of hindering the association of the phthalocyanine compounds and such compounds themselves are light resistant and heat resistant.

Furthermore, it is preferable that the amino compounds for use in the present invention have a melting point of 150° C. or more in order to maintain the thermal stability of the light absorption layer and to prevent the optical characteristics of the light absorption layer from being changed at high temperatures and high humidities. In view of the above, imidazole derivatives, benzimidazole derivatives and thiazole derivatives are particularly preferable for use in the present invention.

The above-mentioned phthalocyanine compounds of formulae (I), (It) and (II) can be easily synthesized by cyclization of a mixture of their respective corresponding phthalonitrile compounds. To be more specific, the following phthalonitrile of formulae (IV), (V) and (VI) are respectively allowed to react with a metal derivative in alcohol, for instance, in the presence of 1,8-diazabicyclo[5,4,0]-7-undecene, with the application of heat thereto.

(4)

(5)

(6)

Dyes used as recording materials in conventional information recording materials can also be added as light absorbing materials to the above-mentioned phthalocyanine compounds (I), (II) and (III).

Examples of such dyes are cyanine dyes, pyrylium dyes, thiopyrylium dyes, azulenium dyes, squalilium dyes, metal complex dyes such as Ni, Cr complex dyes, naphthoquinone.anthraquinone dyes, indophenol dyes, indoaniline dyes, triphenylmethane dyes, triarylmethane dyes, aminium.diimmonium dyes and nitroso compounds.

Further, when necessary, a third component such as a binder or a stabilizer can also be added.

It is preferable that the light absorption layer have a thickness of 100 to 5,000 Å, more preferably a thickness of 500 to 3000 Å, to obtain appropriate recording sensitivity and reflectivity.

As the material for the substrate, varieties of materials used for the substrate of conventional information recording medium can be employed.

Examples of the materials for the substrate for the optical recording medium of the present invention are acrylic resins such as polymethyl methacrylate; vinyl chloride resins such as polyvinyl chloride and vinyl chloride copolymer; epoxy resin; polycarbonate resin; amorphous polyolefin; polyester; glass such as soda-lime glass; and ceramics. In particular, from the viewpoints of dimensional stability, transparency and flatness, as the materials for the substrate, polymethyl methacrylate, polycarbonate resin, epoxy resin, amorphous polyolefin, polyester and glass are preferable for use in the present invention.

In order to improve the flatness and adhesiveness of the surface of the substrate and also to prevent the deterioration of the surface of the substrate, an undercoat layer may be provided between the light absorption layer and the substrate.

Examples of the materials for the undercoat layer are polymers such as polymethyl methacrylate, acrylic acid/methacrylic acid copolymer, styrene/maleic anhydride copolymer, polyvinyl alcohol, N-methylol acrylamide, styrene/sulfonic acid copolymer, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; organic materials such as silane coupling agents; and inorganic materials, for example, inorganic acids such as $SiO_2$ and $Al_2O_3$, and inorganic fluoride compounds such as $MgF_2$.

It is preferable that the undercoat layer have a thickness in the range of 0.005 μm to 20 μm, more preferably in the range of 0.01 μm to 10 μm.

On the surface of the substrate or the undercoat layer, there may be provided a pregroove layer in the form of concave or convex grooves for tracking or for showing address signals. As the material for the pregroove layer, there can be employed a mixture of at least one monomer or oligomer selected from the group consisting of monoacrylate, diacrylate, triacrylate and tetraacrylate, and a photopolymerization initiator.

Furthermore, on the light absorption layer, there may be provided a reflection layer for improvement of S/N ratio and reflectivity of the optical information recording medium, and also for improvement of the recording sensitivity thereof.

AS the material for the reflection layer, there is employed a light reflection material having high reflectivity to laser beams.

Specific examples of such light reflection materials are metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn and Si.

Of the above-mentioned light reflection materials, Au, Al and Ag are particularly preferable for use in the present invention. The above-mentioned materials can be used alone, in combination or in the form of alloys.

It is preferable that the light reflection layer have a thickness in the range of 100 Å to 3000 Å.

The light reflection layer may be interposed between the substrate and the light absorption layer. In this case, recording and reproduction of information are conducted on the side of the light absorption layer which is disposed opposite to the substrate with respect to the light reflection layer.

Furthermore, a protective layer may be provided on the light absorption layer or on the reflection layer in order to protect the light absorption layer or the reflection layer physically or chemically.

Such a protective layer may also be provided on the side of the substrate on which the light absorption layer is not provided in order to improve the scratch resistance and humidity resistance of the optical information recording medium of the present invention.

As the materials for the protective layer, for example, inorganic materials such as SiO, $SIO_2$, $MgF_2$ and $SnO_2$, thermoplastic resin, thermosetting resin, and UV curing resin can be employed.

It is preferable that the protective layer have a thickness in the range of 500 Å to 50 μm.

A method of producing the optical information recording medium of the present invention will now be explained.

The method of producing the optical information recording medium comprises the steps of:

(a) providing a light absorption layer, directly or via an intermediate layer, on a substrate with information pits and/or guide grooves being formed on the surface thereof, by film formation coating, the light absorption layer comprising the phthalocyanine compound (I), the phthalocyanine compound (II), and the phthalocyanine compound (III), (b) providing the light reflection layer, directly or via an inter-mediate layer, on the light absorption layer by vacuum film formation, and (c) providing the protective layer on the light reflection layer.

[Provision of Light Absorption Layer]

In the method of producing the optical information recording medium of the present invention, the above-mentioned light absorption layer comprising as the main components the phthalocyanine compound (I), the phthalocyanine compound (II) and the phthalocyanine compound (III) is provided, directly or via an intermediate layer, on the substrate with information pits and/or guide grooves being formed on the surface thereof, by film formation coating.

More specifically, the phthalocyanine compound (I), the phthalocyanine compound (II) and the phthalocyanine compound (III) are dissolved in a solvent, whereby a light absorption layer formation liquid is prepared.

The thus prepared light absorption layer formation liquid is then coated on the substrate. As the solvent for preparing the light absorption layer formation liquid, conventional organic liquids such as alcohol, cellosolve, halogenated hydrocarbon, ketone and ether can be employed.

As the coating method for providing the light absorption layer, the spin coating method is preferable because the thickness of the light absorption layer can be easily controlled by adjusting the concentration and viscosity of the light absorption layer formation liquid, and the drying temperature of the coated light absorption layer formation liquid.

The above-mentioned undercoat layer is provided on the side of the substrate on which the light absorption layer is provided in order to improve the flatness and adhesion of the substrate, and also to prevent the deterioration of the light absorption layer.

The undercoat layer can be provided by the steps of dissolving the previously mentioned material for the undercoat layer in an appropriate solvent to prepare an undercoat layer formation liquid, and coating the thus prepared undercoat layer formation liquid on the surface of the substrate by a coating method such as spin coating, dip coating or extrusion coating.

[Provision of Light Reflection Layer]

In the present invention, the light reflection layer is provided, directly or via an intermediate layer, on the light absorption layer by vacuum film formation. More specifically, any of the previously mentioned materials for the light reflection layer is deposited on the light absorption layer, for instance, by vacuum deposition, sputtering or ion plating.

[Provision of Protective Layer]

In the present invention, the protective layer is provided on the light reflection layer. More specifically, the previously mentioned materials for the protective layer are deposited on the light reflection layer, for instance, by vacuum film deposition or film coating. As the material for the protective layer, UV curing resin is preferable. A protective layer composed of UV curing resin is formed, for instance, by the steps of coating UV curing resin on the light reflection layer by spin coating, and curing the coated UV curing resin with irradiation of ultraviolet rays.

Other features of this invention will become apparent in the course of the following description of exemplary embodiments, which are given for illustration of the invention and are not intended to be limiting thereof.

Example 1

On a polycarbonate disk with a diameter of 120 mm and a thickness of 1.2 mm, with guide grooves with a depth of about 1500 Å being formed on the surface thereof in the form of concave and convex patterns, serving as a substrate, a light absorption layer with a thickness of about 1500 Å was formed.

More specifically, the light absorption layer was formed as follows:

The phthalocyanine compound (I), the phthalocyanine compound (II) and the phthalocyanine compound (III) with a mixing molar ratio of 0.5/0.2/0.3 [phthalocyanine compound (I)/phthalocyanine compound (II)/phthalocyanine compound (III)] shown in Example 1 in TABLE 1, and 5,6-dimethylbenzimidazole (hereinafter referred to the amino compound) in an amount corresponding to 1.0 in terms of the molar ratio of 5,6-dimethylbenzimidazole to the mixture of the two phthalocyanine compounds (II) and (III), that is, the molar ratio of the amino compound/{the phthalocyanine compound (II)+the phthalocyanine compound (III)}, were dissolved in a mixed solvent of tetrahydrofuran, 1-methoxy-2-butanol and ethylcyclohexane to prepare a light absorption layer formation liquid.

The thus prepared light absorption layer formation liquid was spin coated on the above-mentioned polycarbonate disk and dried, whereby the light absorption layer with a thickness of about 1500 Å was formed on the substrate.

Figure 1:
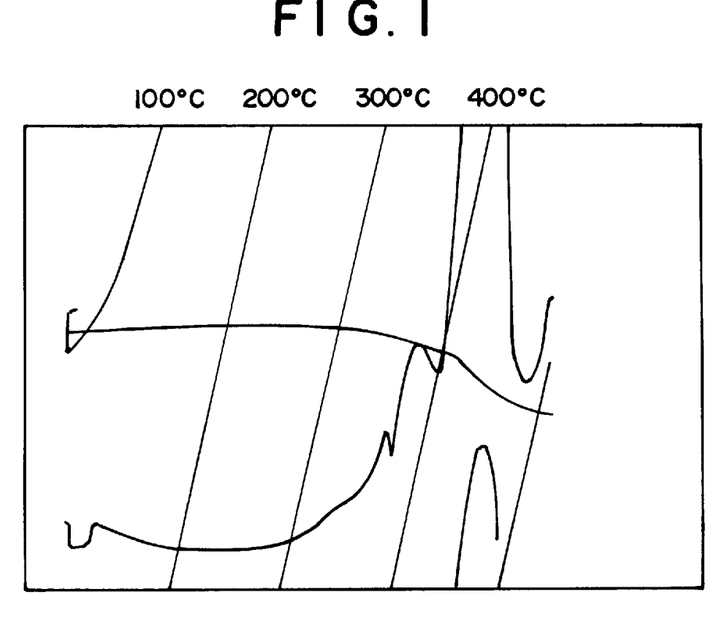
FIG. 1 is a graph showing a thermal analysis of the phthalocyanine compound (I) employed in Example 1.
Figure 2:
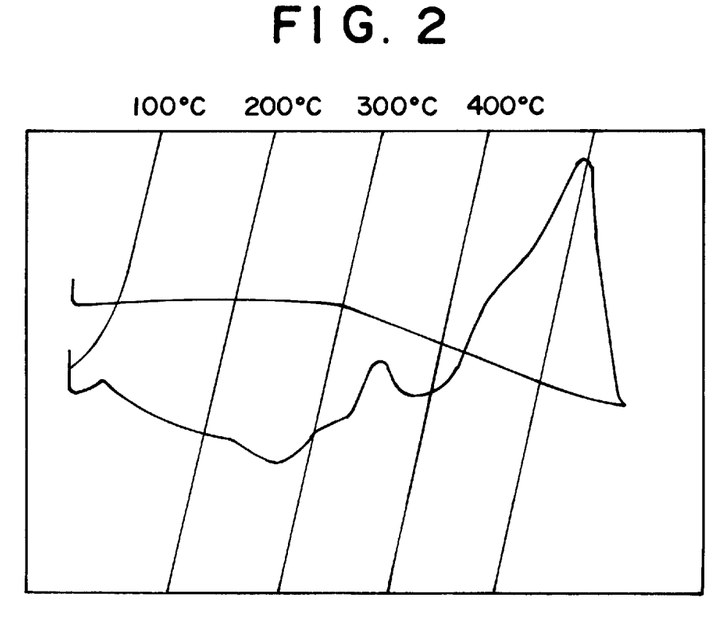
FIG. 2 is a graph showing a thermal analysis of the phthalocyanine compound (II) employed in Example 1.
Figure 3:
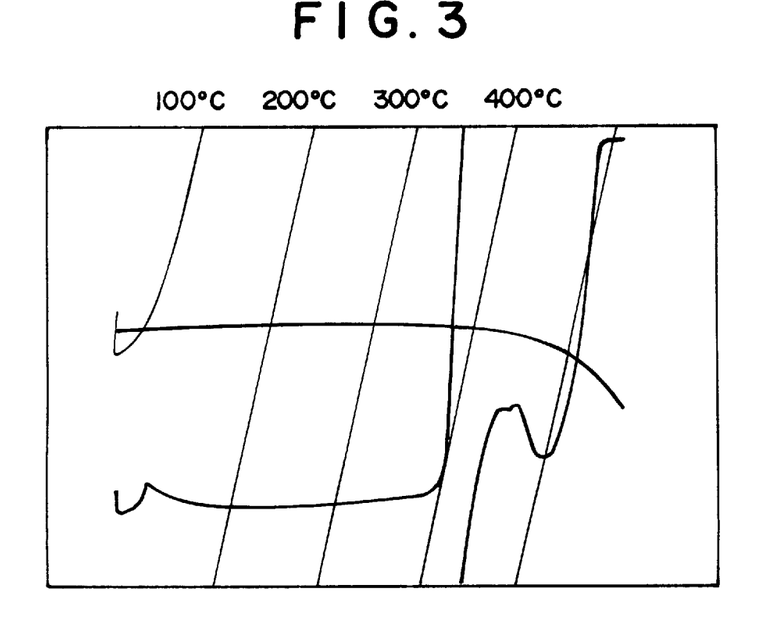
FIG. 3 is a graph showing a thermal analysis of the phthalocyanine compound (III) employed in Example 1.

The thermal decomposition temperatures of the phthalocyanine compounds (I), (II) and (III) were respectively about 290° C., about 252° C., and about 390° C., when measured by a commercially available thermal analyzer (Trademark TG8110, TAS100" made by Rigaku Denki Company, Ltd.), as respectively shown in FIG. 1, FIG. 2 and FIG. 3.

Figure 7:
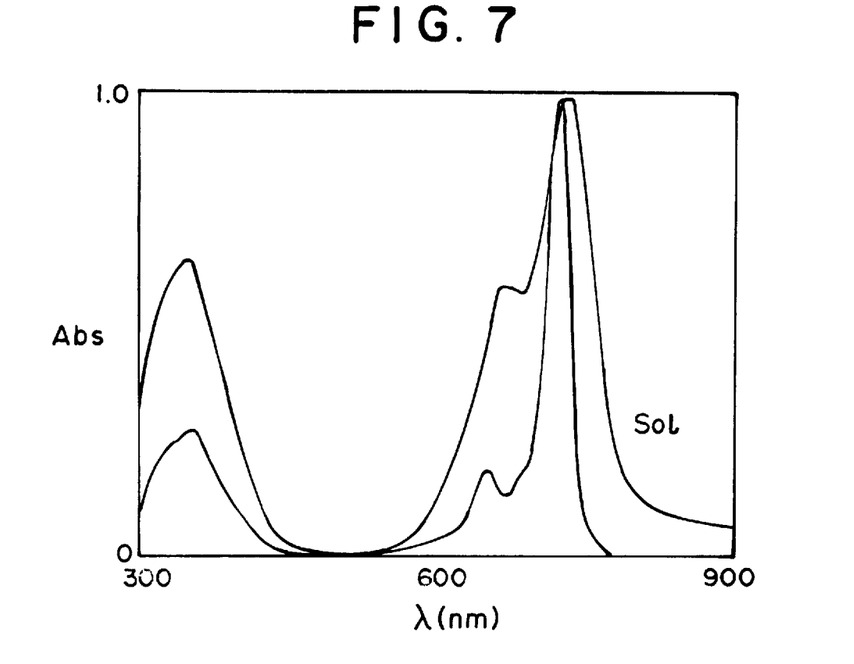
FIG. 7 is a graph showing a light absorption spectrum of the phthalocyanine compound (I) employed in Example 1.
Figure 8:
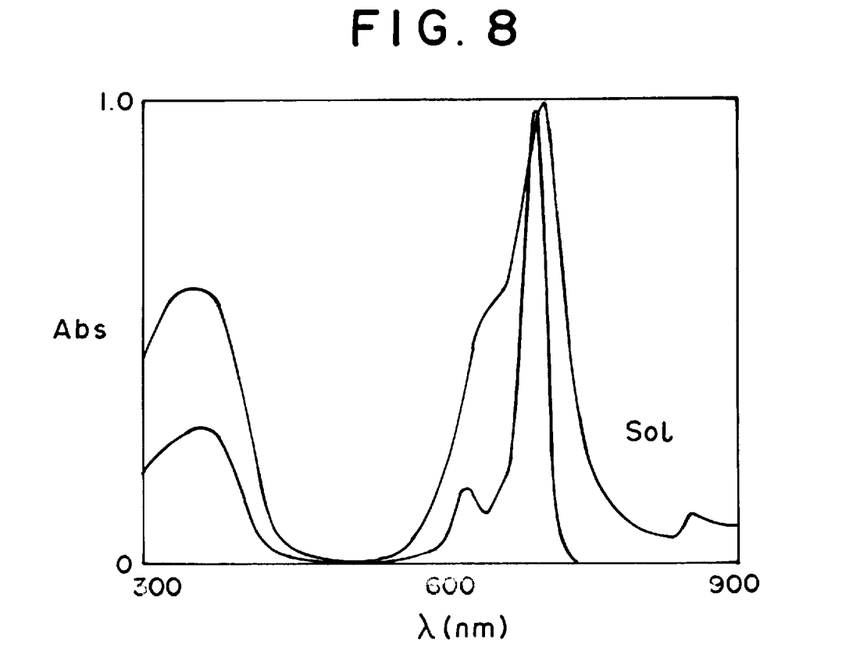
FIG. 8 is a graph showing a light absorption spectrum of the phthalocyanine compound (II) employed in Example 1.
Figure 9:
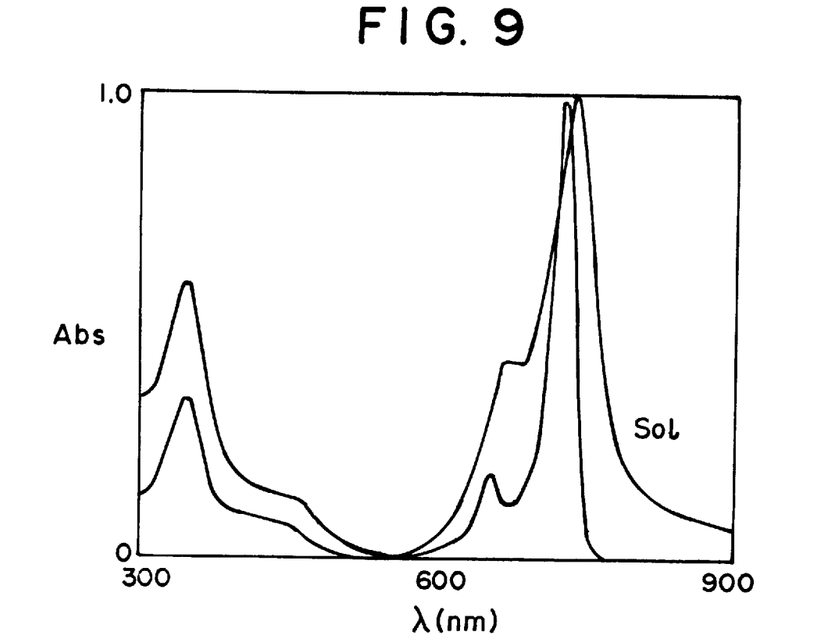
FIG. 9 is a graph showing a light absorption spectrum of the phthalocyanine compound (III) employed in Example 1.

The maximum absorption peak wavelength (λmax) of the above phthalocyanine compound (I) and that(λmax) of a film thereof were respectively about 720 nm (in $CHCl_3$) and about 732 nm (film) as shown in FIG. 7, the maximum absorption peak wavelength (λmax) of the above phthalocyanine compound (II) and that(λmax) of a film thereof were respectively about 695 nm (in $CHCl_3$) and about 704 nm (film) as shown in FIG. 8, and the maximum absorption peak wavelength (λmax) of the above phthalocyanine compound (III) and that(λmax) of a film thereof were respectively about 721 nm (in $CHCl_3$) and about 732 nm (film) as shown in FIG. 9 when measured by a commercially available spectrophotometer (Trademark UV-3100" made by Shimadzu Seisakusho Ltd.).

A light reflection layer of Au with a thickness of about 800 Å was formed on the light absorption layer by sputtering Au.

A protective layer composed of a UV curing resin with a thickness of about 5 μm was provided on the above light reflection layer, whereby an optical information recording medium No. 1 of the present invention was fabricated.

EFM signals were recorded on the thus fabricated optical information recording medium No. 1 and the recorded EFM signals were reproduced therefrom, using a laser beam with a wavelength of 785 nm under the conditions that N.A. was 0.5 and the line speed thereof was 1.2 m/sec. The result was that the reflectivity (Itop) was 73% and that CI error was 220 or less. The recording power β was 4 (β=4).

The pit lengths of the reproduced signals were measured by an interval analyzer. The result was that the deviation of the pit lengths from the standard CD (Test 5B) was 40 ns or less. This value satisfies the write once read many CD standards (Orange Book). The results are shown in TABLE 2.

Examples 2 to 7

The procedure of the fabrication of the optical information recording medium No. 1 in Example 1 was repeated except that the phthalocyanine compounds (I), (II) and (III) employed in Example 1 were respectively replaced by the phthalocyanine compounds (I), (II) and (III) in Examples 2 to 7 shown in TABLE 1, whereby optical information recording media Nos. 2 to 7 of the present invention were fabricated.

The thus fabricated optical information recording media Nos. 2 to 7 were evaluated in the same manner as in Example 1. The results are shown in TABLE 2, which indicate that with respect to each of the optical information recording media Nos. 2 to 7, the reflectivity (Itop), the CI error and the deviation of the pit length thereof satisfy the write once read many type CD standards.

Figure 4:
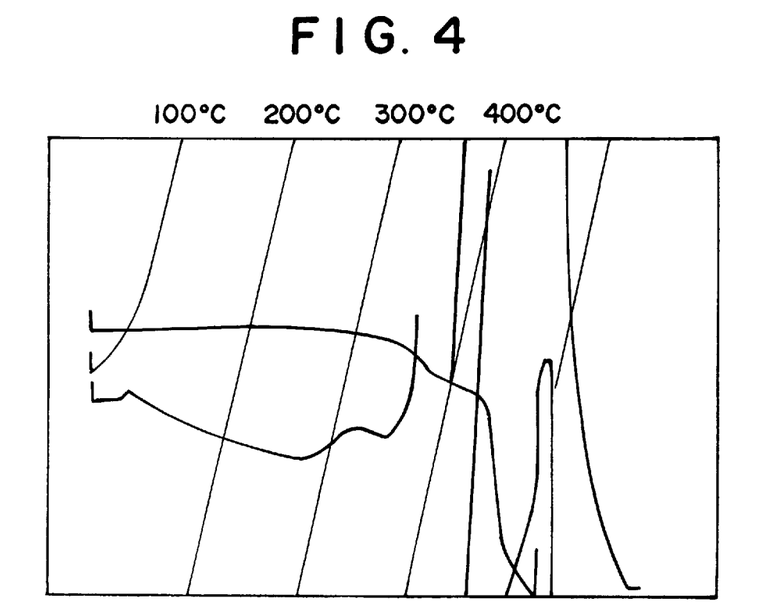
FIG. 4 is a graph showing a thermal analysis of the phthalocyanine compound (I) employed in Example 3.

FIG. 4 shows the results of a thermal analysis of the phthalocyanine compound (I) employed in Example 3.

Figure 5:
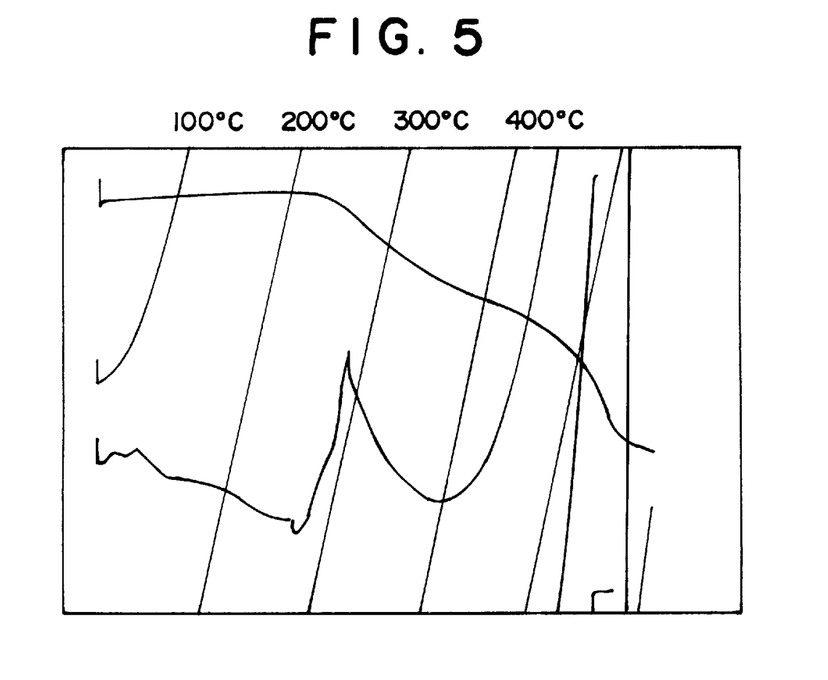
FIG. 5 is a graph showing a thermal analysis of the phthalocyanine compound (II) employed in Example 3.

FIG. 5 shows the results of a thermal analysis of the phthalocyanine compound (II) employed in Example 3.

Figure 10:
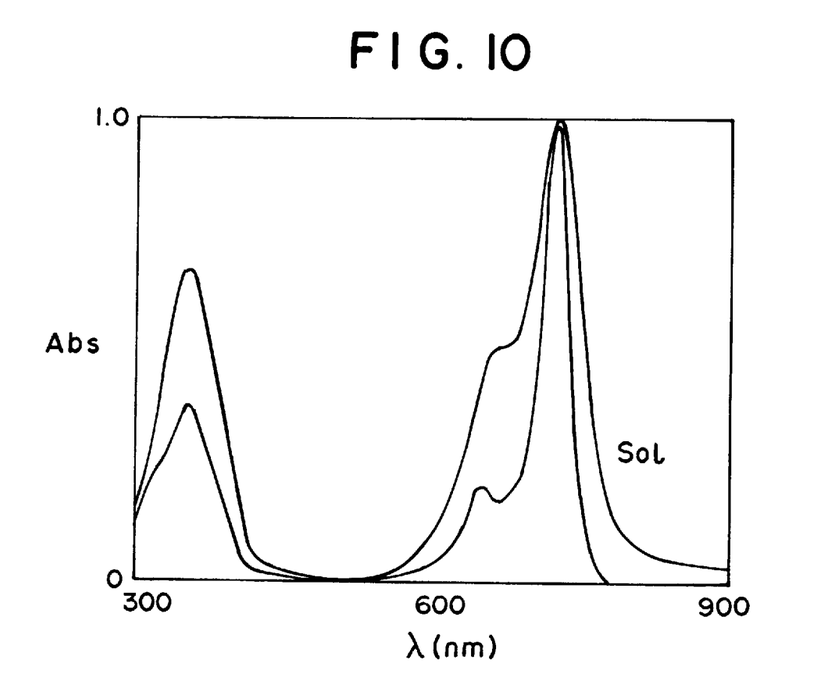
FIG. 10 is a graph showing a light absorption spectrum of the phthalocyanine compound (I) employed in Example 3.

FIG. 10 shows a light absorption spectrum of the phthalocyanine compound (I) employed in Example 3.

Figure 11:
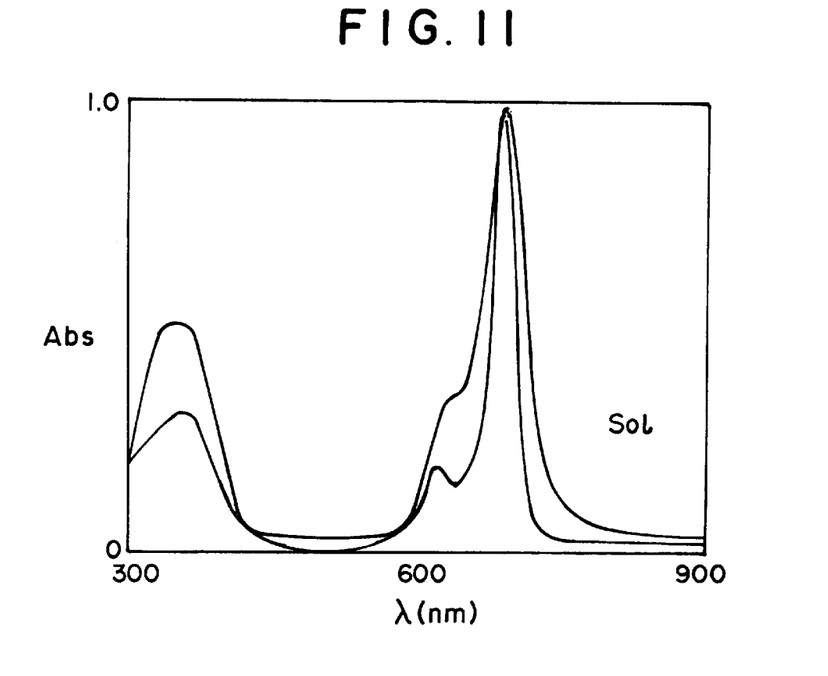
FIG. 11 is a graph showing a light absorption spectrum of the phthalocyanine compound (II) employed in Example 3.

FIG. 11 shows a light absorption spectrum of the phthalocyanine compound (II) employed in Example 3.

Figure 6:
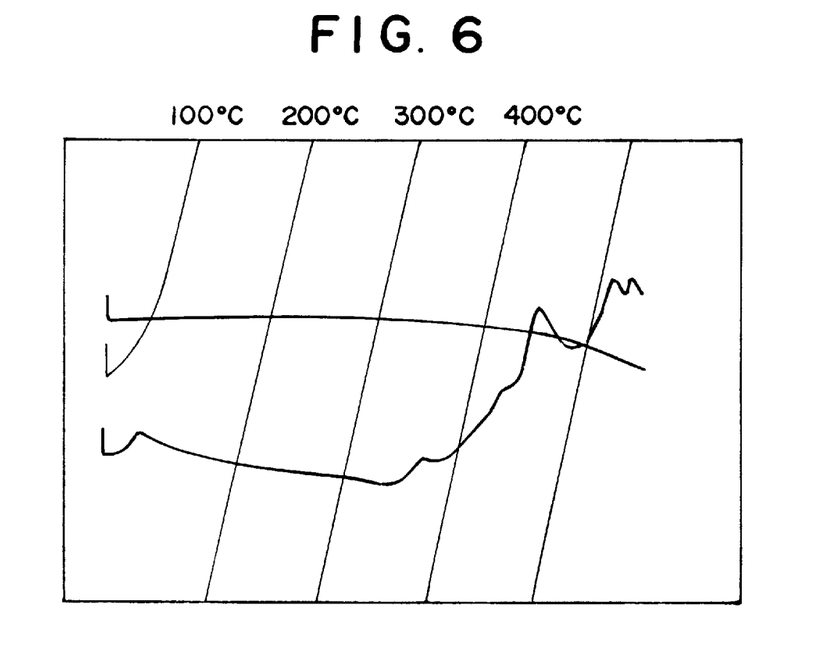
FIG. 6 is a graph showing a thermal analysis of the phthalocyanine compound (III) employed in Example 2.

FIG. 6 shows the results of a thermal analysis of the phthalocyanine compound (III) employed in Example 2.

Figure 12:
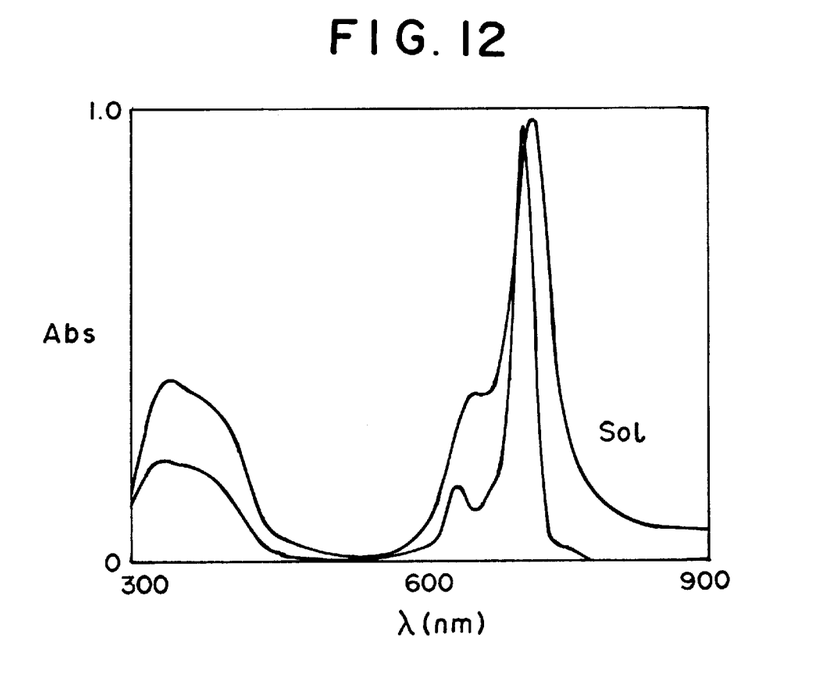
FIG. 12 is a graph showing a light absorption spectrum of the phthalocyanine compound (III) employed in Example 2.

FIG. 12 shows a light absorption spectrum of the phthalocyanine compound (III) employed in Example 2.

TABLE 1

| | Phthalocyanine Compound (I) | | | Phthalocyanine Compound (II) | | | Phthalocyanine Compound (III) | | | Ratio |
| --- | --- | --- | --- | --- | --- | --- | --- | --- | --- | --- |
| | A | λmax | TDT* | A | λmax | TDT* | A | λmax | TDT* | (I)/(II)/(III) |
| Ex. 1 | CF₃–C(H)(Ph)–O– | 720 nm / 732 nm | 290° C. | Ph–C(CF₃)(H)–O– | 695 nm / 704 nm | 252° C. | 2,4,6-trimethylphenyl–S– | 721 nm / 732 nm | 390° C. | 0.5/0.2/0.3 |
| Ex. 2 | CF₃–C(H)(Ph)–O– | 720 nm / 732 nm | 290° C. | Ph–C(CF₃)(H)–O– | 695 nm / 704 nm | 252° C. | 2,4,6-trimethylphenyl–O– | 704 nm / 715 nm | 390° C. | 0.6/0.2/0.2 |
| Ex. 3 | CF₃–C(CF₃)(Ph)–O– | 717 nm / 721 nm | 281° C. | Ph–C(CF₃)(CF₃)–O– | 689 nm / 695 nm | 226° C. | 2,4,6-trimethylphenyl–S– | 721 nm / 732 nm | 390° C. | 0.5/0.2/0.3 |
| Ex. 4 | CF₃–C(CF₃)(Ph)–O– | 717 nm / 721 nm | 281° C. | Ph–C(CF₃)(CF₃)–O– | 689 nm / 695 nm | 226° C. | 2,4,6-trimethylphenyl–S– | 721 nm / 732 nm | 390° C. | 0.4/0.2/0.4 |

TABLE 1-continued

| | Phthalocyanine Compound (I) | | | Phthalocyanine Compound (II) | | | Phthalocyanine Compound (III) | | | Ratio |
| --- | --- | --- | --- | --- | --- | --- | --- | --- | --- | --- |
| | A | λmax | TDT* | A | λmax | TDT* | A | λmax | TDT* | (I)/(II)/(III) |
| Ex. 5 | (2,6-dimethyl-4-methylphenyl group with CF₃, H, O− substituents) | 720 nm/ 735 nm | 332° C. | (phenyl with CF₃, H, O−) | 695 nm/ 704 nm | 252° C. | (2,4-dimethylphenyl-S− with CH(CH₃)CH₃) | 720 nm/ 727 nm | 375° C. | 0.5/0.2/0.3 |
| Ex. 6 | (2,6-dimethyl-4-methylphenyl with C₂F₅, H, O−) | 720 nm/ 731 nm | 305° C. | (phenyl with CF₃, H, O−) | 695 nm/ 704 nm | 252° C. | (2-methylphenyl-S−) | 720 nm/ 724 nm | 400° C. | 0.5/0.2/0.3 |
| Ex. 7 | (phenyl with CF₂CF₂CF₃, H, O−) | 721 nm/ 724 nm | 256° C. | (phenyl with CF₃, H, O−) | 689 nm/ 695 nm | 226° C. | (2,4,6-trimethylphenyl-S−) | 721 nm/ 732 nm | 390° C. | 0.5/0.2/0.3 |

TDT: Thermal Decomposition Temperature
λmax: in CHCl₃/film

TABLE 2

| | Itop (%) | CI Error | Deviation of Pit Length | Amino Compound [mol/Phthalocyanine Compounds (II) + (III)] | |
|---|---|---|---|---|---|
| Ex. 1 | 73 | ○ (220 or less) | within ± 40 | 5,6-dimethylbenz-imidazole | 1 mol |
| Ex. 2 | 76 | ○ | within ± 40 | 5,6-dimethylbenz-imidazole | 1 mol |
| Ex. 3 | 75 | ○ | within ± 40 | 5,6-dimethylbenz-imidazole | 1 mol |
| Ex. 4 | 77 | ○ | within ± 40 | 5,6-dimethylbenz imidazole | 1 mol |
| Ex. 5 | 75 | ○ | within ± 40 | Naphthoimidazole | 1 mol |
| Ex. 6 | 74 | ○ | within ± 40 | Naphthoimidazole | 1 mol |
| Ex. 7 | 76 | ○ | within ± 40 | Naphthoimidazole | 1 mol |

Comparative Examples 1 to 5

The procedure of the fabrication of the optical information recording medium No. 1 in Example 1 was repeated except that the phthalocyanine compounds (I), (II) and (III) employed in Example 1 were replaced by the respective phthalocyanine compounds (I), (II) and (III) or other phthalocyanine compounds in Comparative Examples 1 to 5 shown in TABLE 3, whereby comparative optical information recording media Nos. 1 to 5 were fabricated.

The thus fabricated comparative optical information recording media Nos. 1 to 5 were evaluated in the same manner as in Example 1. The results are shown in TABLE 4, which indicate that with respect to each of the comparative optical information recording media Nos. 1 to 5, the characteristics of the reproduced signals did not satisfy the write once read many type CD standards. In particular, the deviation of the pit length thereof in Comparative Examples 3 to 5 was −60 ns or less in terms of 11T pit and fell outside the standards thereof.

TABLE 3

| | Phthalocyanine Compound (I) | | | Phthalocyanine Compound (II) | | | Phthalocyanine Compound (III) | | | Ratio |
| --- | --- | --- | --- | --- | --- | --- | --- | --- | --- | --- |
| | A | λmax | TDT* | A | λmax | TDT* | A | λmax | TDT* | (I)/(II)/(III) |
| Comp. Ex. 1 | ![structure: phenyl-C(CF₃)(H)-O-] | 720 nm / 732 nm | 290° C. | ![structure: phenyl-C(CF₃)(H)-O-] | 695 nm / 704 nm | 252° C. | ![structure: 2,4,6-trimethylphenyl-S-] | 721 nm / 732 nm | 390° C. | 0.2/0.5/0.3 |
| Comp. Ex. 2 | ![structure: phenyl-C(C₂H₅)(H)-O-] | 730 nm / 751 nm | 256° C. | ![structure: phenyl-C(CF₃)(H)-O-] | 695 nm / 704 nm | 252° C. | ![structure: 2,4,6-trimethylphenyl-S-] | 721 nm / 732 nm | 390° C. | 0.5/0.2/0.3 |
| Comp. Ex. 3 | M: Zn | | | A: ![bornyl-S- structure] | | | | 718 nm / 721 nm | 285° C. | |
| Ex. 4 | M: Cu | | | A: —O—CH[CH(CH₂)₂]₂ | | | | 710 nm / 725 nm | 330° C. | |
| Ex. 5 | M: Pd | | | A: —O—CH[CH(CH₂)₂]₂ Bromide | | | | 718 nm / 730 nm | 325° C. | |

TDT: Thermal Decomposition Temperature

TABLE 4

| | Itop (%) | CI Error | Deviation of Pit Length | Amino Compound [mol/Phthalocyanine Compounds (II) + (III)] | |
|---|---|---|---|---|---|
| Comp. Ex. 1 | 79 | × (220 or less) | within ± 40 | Naphthoimidazole | 1 mol |
| Comp. Ex. 2 | 62 | ○ | within ± 40 | Naphthoimidazole | 1 mol |
| Comp. Ex. 3 | 69 | × (more than 220) | −80 (11T Pit Length) | 5,6-dimethylbenz- imidazole | 1 mol |
| Comp. Ex. 4 | 72 | × (more than 220) | −75 (11T Pit Length) | None | |
| Comp. Ex. 5 | 77 | ○ (220 or less) | −70 (11T Pit Length) | None | |

Japanese Patent Application No. 09-220091 filed Jul. 31, 1997 is hereby incorporated by reference.

What is claimed is:

1. An optical information recording medium comprising:

a substrate, and a light absorption layer formed on said substrate, comprising a phthalocyanine compound (I), a phthalocyanine compound (II), and a phthalocyanine compound (III):

(I)

wherein $M^1$ is VO, one of $A^{11}$ or $A^{12}$, one of $A^{13}$ or $A^{14}$, one of $A^{15}$ or $A^{16}$, and one of $A^{17}$ or $A^{18}$ are each independently —O—C($R^1$)($R^2$)($R^3$), and the other in each pair is a hydrogen atom, in which $R^1$ is a fluorine-substituted alkyl group, $R^3$ is a fluorine-substituted or unsubstituted alkyl group, or a hydrogen atom, and $R^2$ is an unsubstituted phenyl group or a phenyl group substituted with an alkyl group, (II)

wherein $M^2$ is Zn, one of $A^{21}$ or $A^{22}$, one of $A^{23}$ or $A^{24}$, one of $A^{25}$ or $A^{26}$, and one of $A^{27}$ or $A^{28}$ are each independently —O—C($R^1$)($R^2$)($R^3$), and the other in each pair is a hydrogen atom, in which $R^1$ is a fluorine-substituted alkyl group, $R^3$ is a fluorine-substituted or unsubstituted alkyl group, or a hydrogen atom, and $R^2$ is an unsubstituted phenyl group or a phenyl group substituted with an alkyl group, (III)

wherein $M^2$ is Zn, one of $A^{31}$ or $A^{32}$, one of $A^{33}$ or $A^{34}$, one of $A^{35}$ or $A^{36}$, and one of $A^{37}$ or $A^{38}$ are each independently —O—$R^4$ or —S—$R^4$, and the other in each pair is a hydrogen atom, in which $R^4$ is an unsubstituted phenyl group or a phenyl group substituted with an alkyl group.

2. The optical information recording medium as claimed in claim 1, wherein when the molar ratio of said phthalocyanine compound (I) to said phthalocyanine compound (II) to said phthalocyanine compound (III) contained in said light absorption layer is x to y to z, x is in a range of 0.3 to 0.7, y is in a range of 0.1 to 0.4, and z is in a range of 0.2 to 0.6, provided that x+y+z=1.

3. The optical information recording medium as claimed in claim 1, wherein the light absorption layer further comprises at least one amino compound coordinated with at least one of $M^1$ in the phthalocyanine compound (I), $M^2$ in the phthalocyanine compound (II), and $M^2$ in the phthalocyanine compound (III).

4. A method of producing an optical information recording medium comprising the steps of:

providing a light absorption layer, directly or via an intermediate layer, on a substrate with information pits and/or guide grooves being formed on the surface thereof, by film formation coating, said light absorption layer comprising a phthalocyanine compound (I), a phthalocyanine compound (II), and a phthalocyanine compound (III):

(I)

wherein $M^1$ is VO, one of $A^{11}$ or $A^{12}$, one of $A^{13}$ or $A^{14}$, one of $A^{15}$ or $A^{16}$, and one of $A^{17}$ or $A^{18}$ are each independently —O—C($R^1$)($R^2$)($R^3$), and the other in each pair is a hydrogen atom, in which $R^1$ is a fluorine-substituted alkyl group, $R^3$ is a fluorine-substituted or unsubstituted alkyl group, or a hydrogen atom, and $R^2$ is an unsubstituted phenyl group or a phenyl group substituted with an alkyl group, (II)

wherein $M^2$ is Zn, one of $A^{21}$ or $A^{22}$, one of $A^{23}$ or $A^{24}$, one of $A^{25}$ or $A^{26}$, and one of $A^{27}$ or $A^{28}$ are each independently —O—C($R^1$)($R^2$)($R^3$), and the other in each pair is a hydrogen atom, in which $R^1$ is a fluorine-substituted alkyl group, $R^3$ is a fluorine-substituted or unsubstituted alkyl group, or a hydrogen atom, and $R^2$ is an unsubstituted phenyl group or a phenyl group substituted with an alkyl group, (III)

wherein $M^2$ is Zn, one of $A^{31}$ or $A^{32}$, one of $A^{33}$ or $A^{34}$, one of $A^{35}$ or $A^{36}$, and one of $A^{37}$ or $A^{38}$ are each independently —O—$R^4$ or —S—$R^4$, and the other in each pair is a hydrogen atom, in which $R^4$ is an unsubstituted phenyl group or a phenyl group substituted with an alkyl group, providing a light reflection layer, directly or via an intermediate layer, on said light absorption layer by vacuum film formation, and providing a protective layer on said light reflection layer.

5. The method as claimed in claim 4, wherein when the molar ratio of said phthalocyanine compound (I) to said phthalocyanine compound (II) to said phthalocyanine compound (III) contained in said light absorption layer is x to y to z, x is in a range of 0.3 to 0.7, y is in a range of 0.1 to 0.4, and z is in a range of 0.2 to 0.6, provided that x+y+z=1.

6. The method claimed in claim 4, wherein the light absorption layer further comprises at least one amino compound coordinated with at least one of $M^1$ in the phthalocyanine compound (I), $M^2$ in the phthalocyanine compound (II), and $M^2$ in the phthalocyanine compound (III).

* * * * *

UNITED STATES PATENT AND TRADEMARK OFFICE
CERTIFICATE OF CORRECTION

PATENT NO. : 6,045,971
DATED : April 4, 2000
INVENTOR(S) : Toru Yashiro

Page 1 of 1

It is certified that error appears in the above-identified patent and that said Letters Patent is hereby corrected as shown below:

Column 3, Line 64, "the light reflection layer. dr" should read --the light reflection layer.--

Signed and Sealed this

Fifth Day of June, 2001

*Attest:*

*Attesting Officer*
*Commissioner of Patents and Trademarks*

NICHOLAS P. GODICI